(12) United States Patent
Kim et al.

(10) Patent No.: US 8,437,099 B2
(45) Date of Patent: May 7, 2013

(54) HARD DISK DRIVE AND SERVO TRACK WRITING SYSTEM FOR THE SAME

(75) Inventors: Kyung-ho Kim, Seoul (KR); Dong-ho Oh, Seoul (KR); Ha-yong Kim, Seoul (KR); Sung-joon Han, Seoul (KR); Kwang-jo Jung, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/431,963

(22) Filed: Apr. 29, 2009

(65) Prior Publication Data
US 2009/0268331 A1  Oct. 29, 2009

(30) Foreign Application Priority Data
Apr. 29, 2008  (KR) .................. 10-2008-0039837

(51) Int. Cl.
*G11B 5/09*  (2006.01)
(52) U.S. Cl.
USPC .......................................... 360/51; 360/77.03
(58) Field of Classification Search .................. None
See application file for complete search history.

(56) References Cited

U.S. PATENT DOCUMENTS

| | | | | |
|---|---|---|---|---|
| 5,909,333 A | * | 6/1999 | Best et al. ................ | 360/51 |
| 6,909,568 B2 | * | 6/2005 | Fukushi et al. ............ | 360/51 |

FOREIGN PATENT DOCUMENTS

| | | |
|---|---|---|
| JP | 06-302135 | 10/1994 |
| KR | 1998072503 | 11/1998 |
| KR | 19990057754 | 7/1999 |
| KR | 20040024785 | 3/2004 |

* cited by examiner

*Primary Examiner* — Jason Olson
(74) *Attorney, Agent, or Firm* — HolzerIPLaw, PC

(57) ABSTRACT

A hard disk drive includes a housing including a base member and a cover member, a spindle motor disposed in the housing, a data storage disk disposed on the spindle motor, an actuator disposed in the housing to move a read/write head to a position on the data storage disk, a clock signal providing unit disposed on the data storage disk to provide a clock signal of the data storage disk, a position signal providing unit disposed on the actuator to provide a position signal of the actuator, and first and second windows disposed in the housing to correspond to the clock signal providing unit and the position signal providing unit.

38 Claims, 8 Drawing Sheets

HARD DISK DRIVE AND SERVO TRACK WRITING SYSTEM FOR THE SAME

CROSS-REFERENCE TO RELATED APPLICATIONS

This application claims priority under 35 U.S.C. §119(a) from Korean Patent Application No. 10-2008-0039837, filed on Apr. 29, 2008, in the Korean Intellectual Property Office, the disclosure of which is incorporated herein in its entirety by reference.

BACKGROUND

Field of the Invention

The general inventive concept relates to a hard disk drive, and more particularly, to a hard disk drive and a servo track writing system to write servo track information on a disk in the hard disk drive.

Hard disk drives (HDDs) are one type of information storage devices which are used to record data on a disk or to reproduce data from the disk by using a read/write head. In the HDD, the read/write head performs a read/write operation while being moved to a desired position by an actuator in a position above a recording surface of a rotating disk at a predetermined height.

The HDD includes a disk, a spindle motor to rotate the disk, the read/write head, and the actuator to move the read/write head to a desired position of the disk. These elements are protected by being encompassed by a base member and a cover member. The actuator includes a swing arm which is rotatably coupled to an actuator pivot, a suspension assembly installed at a tip end of the swing arm and used to support a slider on which the read/write head is mounted to be elastically biased toward a surface of the disk, and a voice coil motor (VCM) to rotate the swing arm.

When a power of the HDD is turned on and the disk starts to rotate, the VCM rotates the swing arm of the actuator in a direction that moves the slider having the read/write head across the recording surface of the disk. The read/write head mounted on the slider performs a function of reading or writing data with respect to the recording surface of the disk. When the HDD is not in operation, that is, the rotation of the disk is stopped, the VCM rotates the swing arm of the actuator in an opposite direction so that the read/write head may be moved away from the recording surface of the disk to prevent the read/write head from colliding with the recording surface of the disk.

In the HDD configured as above, servo track information is previously recorded on the surface of the disk to allow the read/write head to quickly and accurately move to a desired position on the disk, which is referred to as servo track writing (STW). Conventionally, two types of methods have been used for STW. One of the methods is to write servo track information to the disk by inserting a clock head and a push pin in two holes formed in a housing of the HDD, after an assembly of the HDD has been completed. In this method, a servo track information writing process needs to be performed in a clean room in order to prevent intrusion of foreign material into an inside portion the HDD through the two holes. However, when the STW process which takes a long time is performed in the clean room, process costs associated therewith increase. Also, a strength of the housing of the HDD is weakened because the two holes which are relatively large are formed in the housing. Furthermore, when the actuator is moved by the push pin, a position control of the actuator may not be accurately performed since the push pins often slip.

The other method is an off-line STW method. According to the off-line STW method, STW is previously performed to a plurality of disks by installing the disks at a separate off-line servo track writer (OSTW) before being assembled to the spindle motor in the HDD. Since the off-line STW method also needs to be performed in the clean room and requires an expensive OSTW, the process and manufacturing costs associated therewith increase. Also, in the process of assembling the disks which have completed the STW on a hub of the spindle motor in the HDD, one by one, rotation centers and phases of the disks are often not congruent with one another. As a result, repeatable run-out (RRO) is undesirably generated in the disk during an operation of the HDD.

SUMMARY

The general inventive concept provides a hard disk drive capable of writing servo track information using a simple device in a general environment outside of a clean room and a servo track writer used therefor.

Additional features and/or utilities of the present general inventive concept will be set forth in part in the description which follows and, in part, will be obvious from the description, or may be learned by practice of the general inventive concept.

Exemplary embodiments of the present general inventive concept provide a hard disk drive which includes a housing including: a base member and a cover member, a spindle motor disposed in the housing, a data storage disk disposed on the spindle motor, an actuator disposed in the housing to move a read/write head to a position on the data storage disk, a clock signal providing unit disposed on the data storage disk to provide a clock signal of the data storage disk, a position signal providing unit disposed on the actuator to provide a position signal of the actuator, and first and second windows disposed in the housing at positions to correspond to the clock signal providing unit and the position signal providing unit.

The first and second windows may be formed in the cover member of the housing.

A light transmitting member which transmits a laser beam and seals the housing may be installed at each of the first and second windows. The light transmitting member may be a flat glass or a lens. An inner surface of the light transmitting member and an inner surface of the housing may form a same plane.

A sealing cover to cover each of the first and second windows may be attached to an outer surface of the housing.

The clock signal providing unit may be provided at any one of an outermost circumferential portion of the disk, an innermost circumferential portion of the disk, and an outermost circumferential portion of a clamp which fixes the data storage disk to the spindle motor. The clock signal providing unit may be a segment tape attached at any one of the outermost circumferential portion of the data storage disk, the innermost circumferential portion of the data storage disk, and the outermost circumferential portion of a clamp which fixes the data storage disk to the spindle motor. The clock signal providing unit may be a plurality of segments marked on any one of the outermost circumferential portion of the data storage disk, the innermost circumferential portion of the data storage disk, and the outermost circumferential portion of a clamp which fixes the data storage disk to the spindle motor.

The actuator may include a pivot shaft disposed on the base member, an actuator arm rotatably coupled to the pivot shaft, and a voice coil motor to rotate the actuator arm wherein the position signal providing unit may be provided at any one of an outer edge portion of a rear end portion of the actuator arm, a middle portion of the actuator arm, and an outermost circumferential portion of the pivot shaft. The position signal providing unit may be a segment tape attached at any one of the outer edge portion of a rear end portion of the actuator arm, the middle portion of the actuator arm, and the outermost circumferential portion of the pivot shaft. The position signal providing unit may be a plurality of segments marked on any one of the outer edge portion of a rear end portion of the actuator arm, the middle portion of the actuator arm, and the outermost circumferential portion of the pivot shaft.

Exemplary embodiments of the present general inventive concept also provide a servo track writer to write servo track information to a disk of the hard disk drive described above, the servo track writer including: a frame, an arm coupled to and supported by the frame, a clock signal detection unit installed on the arm at a position to correspond to the first window of the hard disk drive and to detect a clock signal of the disk provided by a clock signal providing unit, a position signal detection unit installed on the arm at a position to correspond to the second window of the hard disk drive and to detect a position signal of the actuator arm provided by a position signal providing unit, and a control unit to control the actuator and the read/write head to write servo track information to the disk according to the clock signal and the position signal respectively detected by the clock signal detection unit and the position signal detection unit.

The frame may include a base to support the hard disk drive.

The arm may extend above the hard disk drive.

The clock signal detection unit and the position signal detection unit may respectively detect, by using a laser beam, the clock signal of the disk and the position signal of the actuator provided by the clock signal providing unit and the position signal providing unit. Each of the clock signal detection unit and the position signal detection unit may include a laser diode to emit a laser beam to a surface of the clock signal detection unit or the position signal detection unit via the first or second window, and a photodiode to detect the laser beam reflected by the clock signal detection unit or the position signal detection unit.

After generating a position control signal to control a position of the actuator and a signal related to servo track information to be written to the disk according to the clock signal and the position signal, the control unit may transmit the position control signal to a voice coil motor of the actuator and the signal related to the servo track information to the read/write head.

The servo track writer may further include a focusing unit to focus the laser beam emitted by the clock signal detection unit and the position signal detection unit on surfaces of first and second segment tapes.

The arm may be supported by the frame to be capable of moving up and down in a state of being separated from the frame, and the focusing unit which moves the arm up and down may include a lead screw coupled to the arm and a drive motor to rotate the lead screw.

Exemplary embodiments of the present general inventive concept also provide a hard disk drive having a housing which includes a data storage disk disposed within the housing, the data storage disk having a clock signal providing unit to generate a clock signal of the data storage disk, a read/write head having a position signal providing unit to generate a position signal of the read/write head rotatably coupled within the housing, and at least one window disposed on the housing to correspond with at least one of the clock signal providing unit and the position signal providing unit.

The clock signal providing unit may be at least one of a segment tape or a plurality of segments marked on the data storage disk.

The position signal providing unit may be at least one of a segment tape or a plurality of segments marked on the read/write head.

Exemplary embodiments of the present general inventive concept also provide a hard disk drive which includes a housing, a data storage unit disposed within the housing, a head unit to read data from and/or write data to the data storage unit, a terminal electrically connected with the head unit to communicate with an external unit, and a window configured to provide a path to the data storage unit.

The housing may include a first window corresponding to a first signal providing unit of the data storage unit and a second window corresponding to a second signal providing unit of the head unit. The terminal may extend from the housing.

Exemplary embodiments of the present general inventive concept also provide an electronic apparatus which includes a housing to store at least one data storage disk having a clock signal providing unit disposed thereon, an actuator having a read/write head and a position signal providing unit rotatably coupled within the housing, and at least one window disposed on the housing to correspond with at least one of the clock signal providing unit and the position signal providing unit.

The clock signal providing unit may be at least one of a segment tape or a plurality of segments marked on the data storage disk.

The position signal providing unit may be at least one of a segment tape or a plurality of segments marked on the actuator.

The at least one window may include first and second windows corresponding to the clock signal providing unit and the position signal providing unit, respectively.

Each window of the at least one window may include a light transmitting member to transmit a laser beam and to seal the housing.

Exemplary embodiments of the present general inventive concept also provide a method of manufacturing an electronic apparatus having a housing, the method including disposing at least one data storage disk having a clock signal providing unit disposed thereon within the housing, coupling an actuator having a read/write head and a position signal providing unit within the housing, and forming at least one window on the housing to correspond with at least one of the clock signal providing unit and the position signal providing unit.

The forming the at least one window may include forming first and second windows to correspond to the clock signal providing unit and the position signal providing unit, respectively.

The method may further include disposing a light transmitting member to transmit a laser beam and to seal the housing at each window of the at least one window.

Exemplary embodiments of the present general inventive concept also provide a hard disk drive which includes a housing having an assembly with a disk, a terminal formed on a first portion of the housing to transmit a first signal read from the disk, and a window formed on a second portion of the housing to transmit a second signal read from the disk.

The first signal may be an electrical signal and the second signal may be an optical signal.

The first portion may be spaced apart from the second portion.

The housing may be sealed except for the terminal and the window to communicate with one or more external units.

BRIEF DESCRIPTION OF THE DRAWINGS

These and/or other features and/or utilities of the present general inventive concept will become apparent and more readily appreciated from the following description of the exemplary embodiments, taken in conjunction with the accompanying drawings of which.

DETAILED DESCRIPTION OF THE EMBODIMENTS

Figure 1:
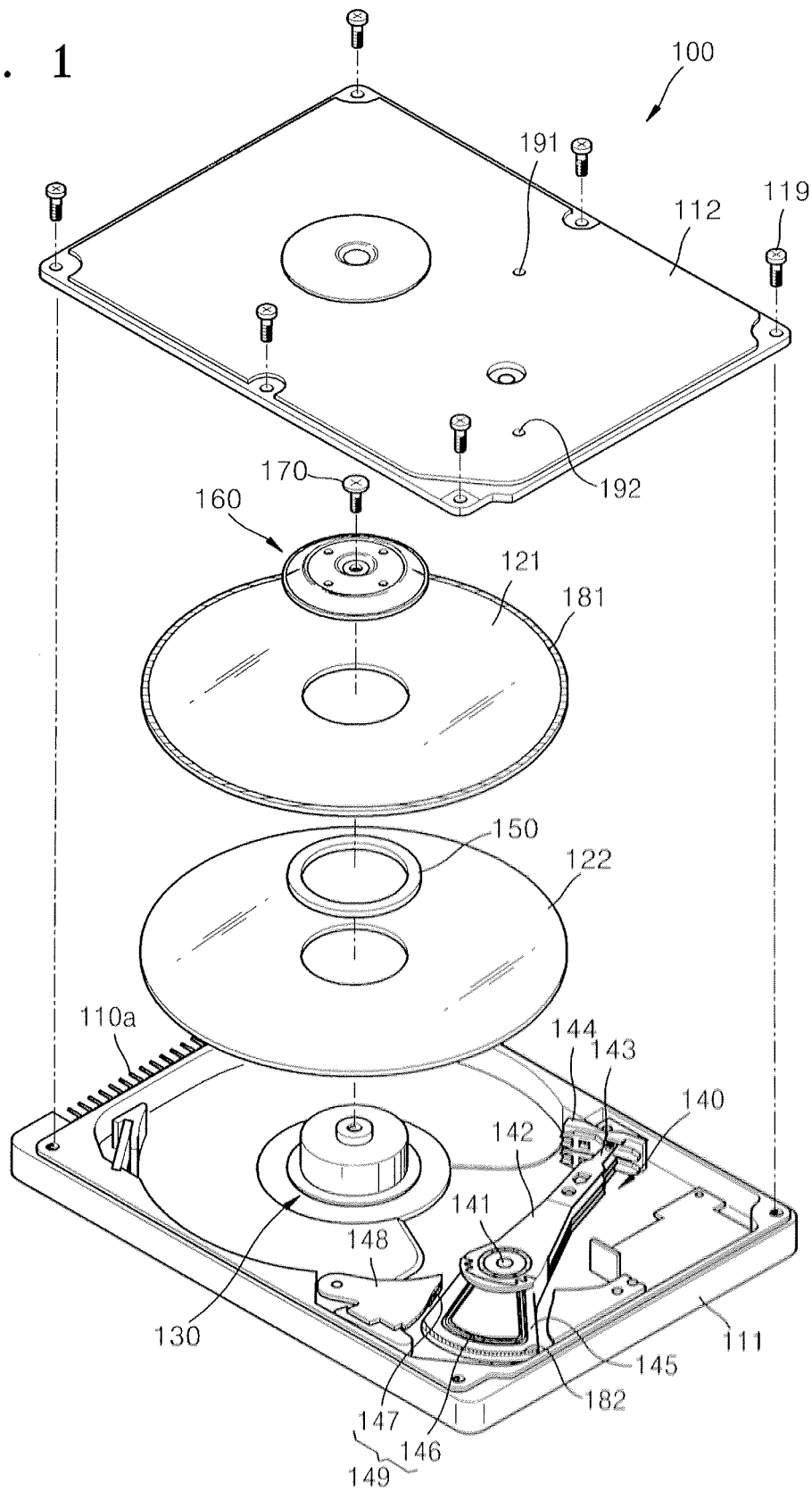
FIG. 1 is an exploded perspective view of an HDD according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
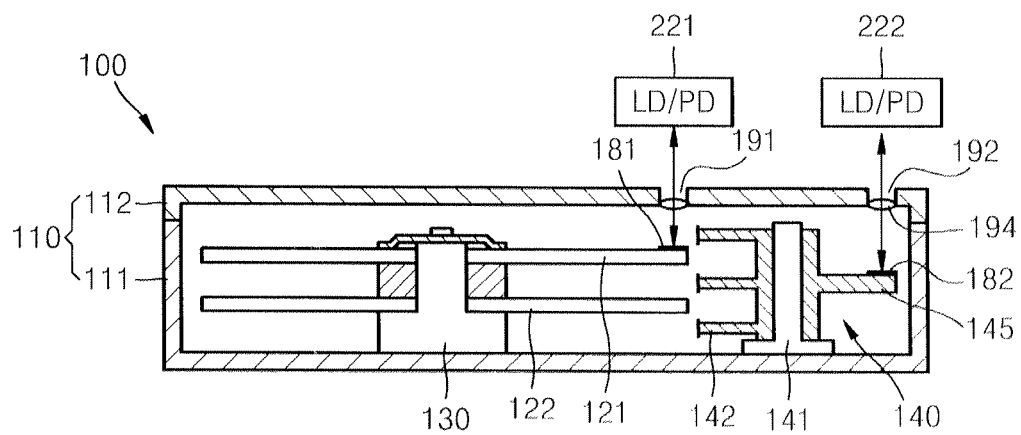
FIG. 2 is a cross-sectional view illustrating an assembly state of the HDD of FIG. 1.

FIG. 1 is an exploded perspective view of a hard disk drive (HDD) 100 according to an exemplary embodiment of the present general inventive concept. FIG. 2 is a cross-sectional view illustrating an assembly state of the HDD 100 of FIG. 1. Referring to FIGS. 1 and 2, the HDD 100 includes a housing 110 having a base member 111 and a cover member 112. The base member 111 and the cover member 112 are coupled to each other using a plurality of screws 119 to thereby provide a sealed space therebetween. The housing 110 has an inner space in which a spindle motor 130 rotates at least one disk, for example, disks 121 and 122, for data storage and an actuator 140 which moves a read/write head (not illustrated) for reading and writing data to a predetermined position on each of the disks 121 and 122 are installed. In exemplary embodiments, the HDD 100 further includes a terminal 110a formed on a first portion of the housing 110 to transmit a first signal read from the disks 121 and 122. The terminal 110a can be used to facilitate communication between a head assembly (not illustrated) having the read/write head to transmit data read from the disks 121 and 122 or to receive data to be recorded onto the disks 121 and 122 to/from an external unit or external apparatus.

The spindle motor 130 is installed on the base member 111. The two disks 121 and 122 may be installed on the spindle motor 130 as illustrated in FIG. 1. However, the present general inventive concept is not limited thereto. That is, in alternative exemplary embodiments, one disk or three or more disks may be installed on the spindle motor 130. When the disks 121 and 122 are installed on the spindle motor 130, a ring-shaped spacer 150 is arranged between the disks 121 and 122 to maintain an interval between the disks 121 and 122. A clamp 160 used to firmly fix the disks 121 and 122 to the spindle motor 130 may be coupled to an upper portion of the spindle motor 130 by using a screw 170.

The actuator 140 includes a pivot shaft 141 installed on the base member 111, an actuator arm 142 rotatably coupled to the pivot shaft 141, a suspension assembly 143 which is installed at a tip end of the actuator arm 142 and which supports a slider on which the read/write head is mounted to be elastically biased toward a surface of each of the disks 121 and 122, and a voice coil motor (VCM) 149 to rotate the actuator arm 142.

The VCM 149 includes a VCM coil 146 coupled to a rear end portion of the actuator arm 142, that is, an over-mold 145, and a magnet 147 arranged to face the VCM coil 146. The magnet 147 is supported by being attached to a yoke 148 which is coupled to the base member 111. The VCM 149 is controlled by a servo control system to rotate the actuator 140 in a direction according to the Fleming's left hand rule by an interaction between current input to the VCM coil 146 and a magnetic field formed by the magnet 147.

In detail, when a power of the HDD 100 is turned on, the disks 121 and 122 start to rotate. Accordingly, the VCM 149 rotates the actuator arm 142 in a counter-clockwise direction so that the read/write head may be moved across a recording surface of each of the disks 121 and 122. In contrast, when the power of the HDD 100 is turned off, the disks 121 and 122 stop rotating. Accordingly, the VCM 149 rotates the actuator arm 142 in a clockwise direction so that the read/write head may be moved out of a path of each of the disks 121 and 122. That is, the VCM 149 would rotate the actuator arm 142 so that the read/write head would not be disposed over the recording surface of each of the disks 121 and 122. The read/write head moved away from a recording surface of each of the disks 121 and 122 is parked in a parking ramp 144 which is provided outside of the disks 121 and 122.

As described above, for the read/write head to quickly and accurately move to a desired position on each of the disks 121 and 122, servo track information is previously written to a surface of each of the disks 121 and 122. To this end, the HDD 100 according to the present exemplary embodiment includes a clock signal providing unit to provide a clock signal of the disks 121 and 122, a position signal providing unit to provide a position signal of the actuator 140, and windows 191 and 192 which are formed in the housing 110 at positions which correspond to the clock signal providing unit and the position signal providing unit.

Referring to FIG. 1, a first segment tape 181 having a high resolution may be used as the clock signal providing unit of the disks 121 and 122. The first segment tape 181 may be attached to an outermost circumferential portion of an upper surface of the upper disk 121 of the disks 121 and 122. A second segment tape 182 having a high resolution may be used as the position signal providing unit of the actuator 140. The second segment tape 182 may be attached to a rear end portion of the actuator arm 142. That is, the second segment tape 182 may be attached to an outermost edge portion of the upper surface of an over-mold 145.

In exemplary embodiments, the first and second segment tapes 181 and 182 and the disks 121 and 122 may be different materials having different characteristics. However, in alternative exemplary embodiments, the first and second segment tapes 181 and 182 may be the same or substantially similar materials as the disks 121 and 122, but may have different characteristics according to a surface treatment thereof. The first and second segment tapes 181 and 182 and/or the disks 121 and 122 may include a pattern, a feature, or a characteristic along a circumferential direction of the disks 121 and 122 or the actuator 140 in order to cause a change which is recognizable by the clock signal detection unit 221 or the position signal detection unit 222. However, the present general inventive concept is not limited thereto.

Figure 6:
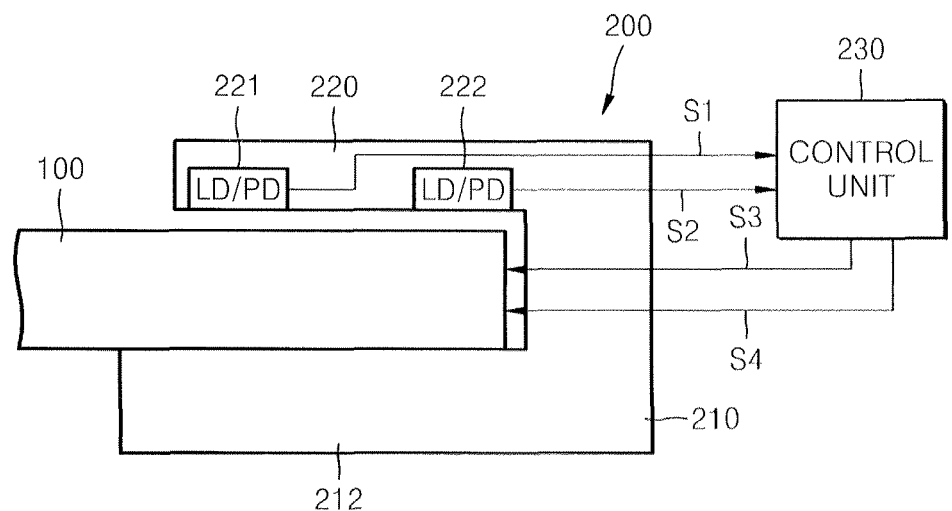
FIG. 6 illustrates a servo track writer according to an exemplary embodiment of the present general inventive concept.

The windows 191 and 192 may penetrate the cover member 112 of the housing 110 to allow a laser beam emitted from each of the clock signal detection unit 221 and the position signal detection unit 222 of a servo track writer 200 of FIG. 6 to pass through. The first window 191 may be used to detect a clock signal of each of the disks 121 and 122 and may be formed at a position corresponding to the first segment tape 181 which is attached to the upper disk 121. The second window 192 may be used to detect a position signal of the actuator 140 and may be formed at a position corresponding to the second segment tape 182 which is attached to the over-mold 145 of the actuator arm 142.

In exemplary embodiments, the windows 191 and 192 may be a lens or a glass. The windows 191 and 192 may not affect a characteristic of a laser beam or light beam passing therethrough. However, the present general inventive concept is not limited thereto. That is, in alternative exemplary embodiments, the windows 191 and 192 may further include materials which may enhance and/or focus the laser beam or the light beam passing through the windows 191 and 192.

In further exemplary embodiments, the windows 191 and 192 may include different materials having different characteristics. However, in alternative exemplary embodiments, the windows 191 and 192 may be the same or substantially similar materials, but may have different characteristics according to a surface treatment thereof. In exemplary embodiments, the windows 191 and 192 may have circular shapes, however, the present general inventive concept is not limited thereto. That is, in alternative exemplary embodiments, the windows 191 and 192 may have a size and/or shape which corresponds to a size and/or shape of the first and second segment tapes 181 and 182.

In yet further exemplary embodiments, a sealant (not illustrated) may be disposed between the windows 191, 192 and the cover member 112 to secure and/or seal the windows 191, 192 to the housing 110.

Although it is not illustrated in the drawings, in alternative exemplary embodiments, the first and second windows 191 and 192 may be formed in the base member 111 of the housing 110. In this case, the first segment tape 181 may be attached to a lower surface of a lower disk 122 while the second segment tape 182 may be attached to a lower surface of the over-mold 145 of the actuator arm 142.

Figure 3A:
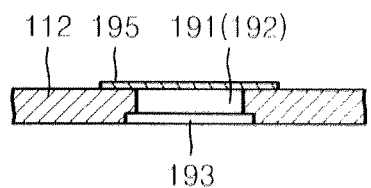
FIGS. 3A and 3B are cross-sectional views illustrating a sectional structure of a window of FIG. 1.
Figure 3B:
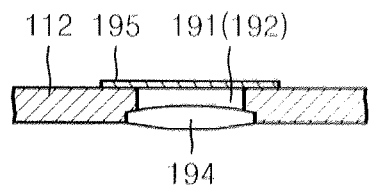

FIGS. 3A and 3B are cross-sectional views illustrating a sectional structure of the window of FIG. 1. Referring to FIGS. 3A and 3B, a light transmitting member capable of transmitting a laser beam and simultaneously sealing the inside of the housing 110 may be installed at the first and second windows 191 and 192. In exemplary embodiments, a flat glass 193 illustrated in FIG. 3A or a lens 194 illustrated in FIG. 3B may be used as the light transmitting member. The use of the lens 194 may be preferable since the lens 194 can focus a laser beam. However, the present general inventive concept is not limited thereto. In exemplary embodiments, an inner surface of the light transmitting member and an inner surface of the cover member 112 may form a same plane so that a flow of air around the disks 121 and 122 may not be interrupted. However, the present general inventive concept is not limited thereto. That is, in alternative exemplary embodiments, the inner surface of the light transmitting member 193, 194 and the inner surface of the cover member 112 may be formed in separate planes.

After the writing of servo track information is completed, a sealing cover 195 used to cover the first and second windows 191 and 192 may be attached to an outer surface of the cover member 112 to securely seal the inside of the housing 110. In exemplary embodiments, the sealing cover 195 may have a shape of a tape or a thin plate. However, the present general inventive concept is not limited thereto. That is, in alternative exemplary embodiments, the sealing cover 195 may have various other shapes which correspond to a size and/or shape of the first and second windows 191 and 192.

Figure 3C:
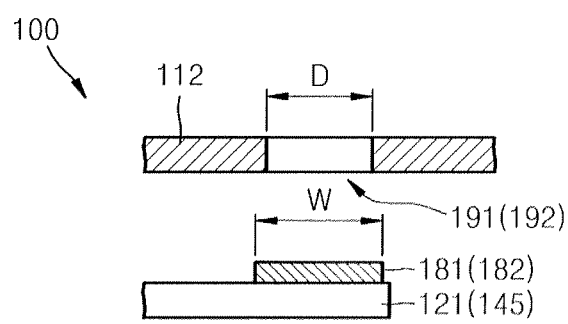
FIG. 3C is a partial cross-sectional view illustrating a window and a clock/position signal providing unit according to an exemplary embodiment of the present general inventive concept.

FIG. 3C is a partial cross-sectional view illustrating a window and a clock/position signal providing unit according to an exemplary embodiment of the present general inventive concept.

The windows 191 and 192 may be formed in various shapes such as a rectangle or a triangle, and may have a diameter D which may be equal to or smaller than a width W of the first and second segment tapes 181 and 182, respectively (FIG. 3C). That is, a diameter D of the windows 191 and 192 may be smaller than a length of the first and second segment tapes 181 and 182, in a radial direction of the disks 121 and 122. However, in alternative exemplary embodiments, D may refer to an outermost cross-sectional dimension of the windows 192 and 192. The windows 191 and 192 may have a thickness which allows the clock detection unit 221 and position detection unit 222 to effectively detect signals from at least one of the clock signal providing unit 181 and the position signal providing unit 182.

Figure 4A:
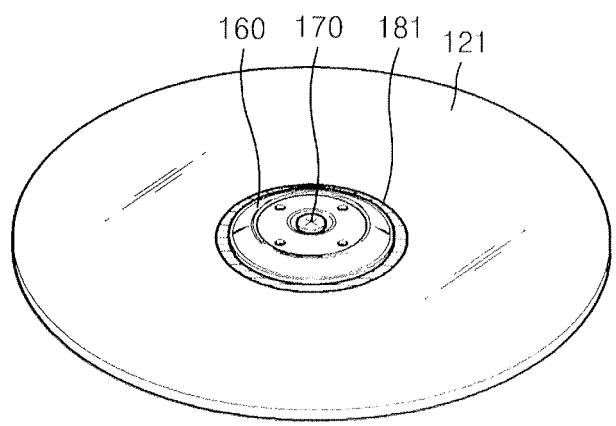
FIGS. 4A and 4B are perspective views illustrating different attachment positions of a first segment tape of FIG. 1.
Figure 4B:
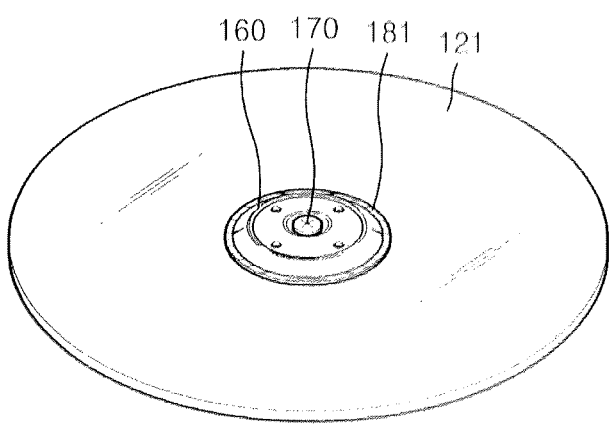
Figure 4C:
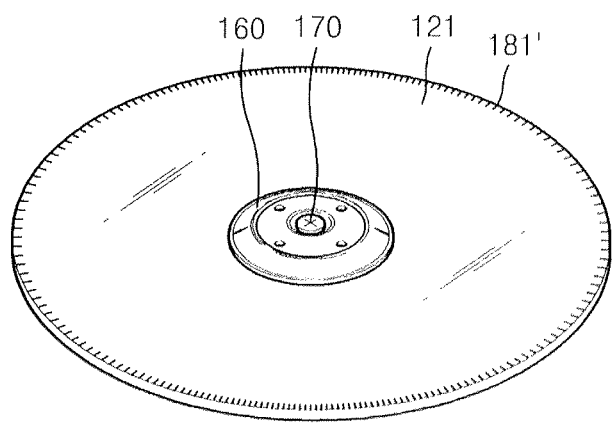
FIG. 4C is a perspective view illustrating a plurality of marked segments as a modification of the first segment tape of FIG. 1.

FIGS. 4A and 4B are perspective views illustrating different attachment positions of the first segment tape 181 of FIG. 1. FIG. 4C is a perspective view illustrating a plurality of marked segments as a modification of the first segment tape 181 of FIG. 1. Referring to FIG. 4A, in exemplary embodiments, the first segment tape 181 may be attached to an innermost circumferential portion of the disk 121, instead of on the outermost circumferential portion of the disk 121. Referring to FIG. 4B, in alternative exemplary embodiments, the first segment tape 181 may be attached to a position close to the disk 121, for example, on an outermost circumferential portion of the clamp 160 which rotates with the disks 121 and 122, instead of on the disk 121 itself.

As described above, the first segment tape 181 may be attached to a variety of positions and components of the HDD 100. That is, in exemplary embodiments, the first segment tape 181 may be attached directly to the disk 121 or to the clamp 160 which is coupled to the disk 121. Accordingly, the first window 191 may be formed at a variety of positions of the housing 110 which correspond to the attachment position of the first segment tape 181.

Next, referring to FIG. 4C, in addition to the first segment tape 181 being used as the clock signal providing unit of each of the disks 121 and 122, a plurality of segments 181' may also be directly marked on the outermost circumferential portion of the upper surface of the disk 121. Similar to the first segment tape 181 illustrated in FIGS. 4A and 4B, the segments 181' may be marked not only on the outermost circumferential portion of the disk 121 but also on the innermost circumferential portion of the disk 121 and/or on the outermost circumferential portion of the clamp 160.

Figure 5A:
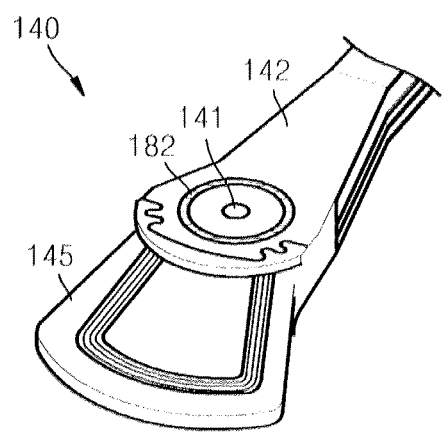
FIGS. 5A and 5B are perspective views illustrating different attachment positions of a second segment tape of FIG. 1.
Figure 5B:
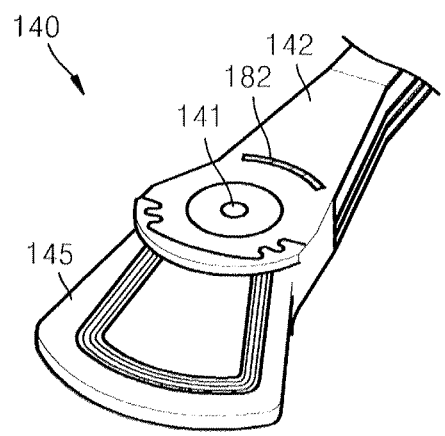
Figure 5C:
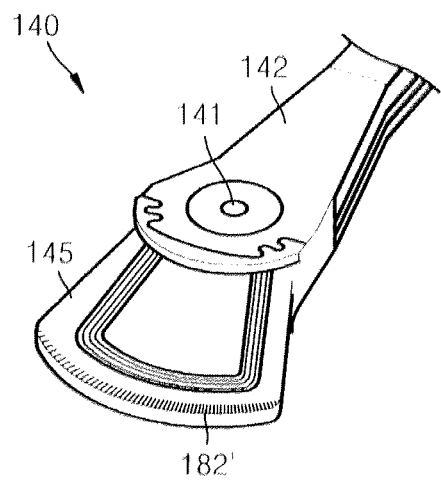
FIG. 5C is a perspective view illustrating a plurality of marked segments as a modification of the second segment tape of FIG. 1.

FIGS. 5A and 5B are perspective views illustrating different attachment positions of the second segment tape 182 of FIG. 1. FIG. 5C is a perspective view illustrating a plurality of marked segments as a modification of the second segment tape 182 of FIG. 1. Referring to FIG. 5A, the second segment tape 182 may be attached to a circumferential portion of the pivot shaft 141, instead of on the outermost edge portion of the over-mold 145 of the actuator arm 142. Referring to FIG. 5B, the second segment tape 182 may be attached to a middle portion of the actuator arm 142.

As described above, the second segment tape 182 may be attached to a variety of positions on the actuator 140. Accordingly, the second window 192 may be formed at a variety of positions of the housing 110 which correspond to the attachment position of the second segment tape 182.

Next, referring to FIG. 5C, in addition to the second segment tape 182 being used as the position signal providing unit of the actuator 140, a plurality of segments 182' may also be directly marked on the outermost circumferential portion of the upper surface of the over-mold 145. Similar to the second segment tape 182 illustrated in FIGS. 5A and 5B, the segments 182' may be marked not only on the outermost circumferential portion of the over-mold 145, but also on the outermost circumferential portion of the pivot shaft 141 and/or on the middle portion of the actuator arm 142. However, the present general inventive concept is not limited thereto.

FIG. 6 illustrates a servo track writer 200 according to an exemplary embodiment of the present general inventive concept. Referring now to FIGS. 2 and 6, the servo track writer 200 according to the present exemplary embodiment writes servo track information to a surface of each of the disks 121 and 122 installed inside the HDD 100, which are configured as described above, and includes a frame 210, an arm 220 coupled to the frame 210, a clock signal detection unit 221 and a position signal detection unit 222 which are installed on the arm 220, and a control unit 230.

The frame 210 supports the servo track writer 200 and may include a base 212 which supports the HDD 100. The arm 220 is coupled to the frame 210 and extends above the HDD 100, thus supporting the clock signal detection unit 221 and the position signal detection unit 222 in a position above the HDD 100.

The clock signal detection unit 221 detects a clock signal of the disks 121 and 122 installed in the HDD 100 and may include a laser diode LD and a photodiode PD. In detail, the LD emits a laser beam. The laser beam passes through the first window 191 and is incident on the first segment tape 181 which is the clock signal providing unit of the disks 121 and 122. The laser beam reflected by the first segment tape 181 is detected by the PD. As described above, the clock signal detection unit 221 detects the clock signal of the disks 121 and 122 from the first segment tape 181 in the form of a light pulse by using the laser beam. The detected clock signal in form of the light pulse is converted to an electric pulse by the PD. A clock signal S1 converted to the electric pulse is transmitted to the control unit 230.

The position signal detection unit 222 detects a position signal of the actuator 140 installed in the HDD 100 and may include a LD and a PD. As described above, the position signal detection unit 222 detects the position signal of the actuator 140 from the second segment tape 182 in the form of a light pulse using a laser beam. The detected position signal in the form of the light pulse is converted to an electric pulse by the PD. A position signal S2 converted to the electric pulse is transmitted to the control unit 230.

The control unit 230 generates a signal related to servo track information which is to be written to the disks 121 and 122 and a position control signal to control the position of the actuator 140, according to the received clock signal and position signal. A position control signal S3 of the actuator 140 is transmitted to the VCM 149 of the actuator 140 to control the position of the actuator 140. A signal S4 related to servo track information is transmitted to the read/write head of the actuator 140. Accordingly, while the position of the actuator 140 is under control, the read/write head writes the servo track information at an accurate position on the surface of each of the disks 121 and 122 which are rotated.

When heights of the first and second segment tapes 181 and 182 provided in the HDD 100 are determined, it may be possible to allow the laser beam to be focused on the surfaces of the first and second segment tapes 181 and 182 by adjusting installation heights of the clock signal detection unit 221 and the position signal detection unit 222 and a refractive index of the lens 194 installed in the windows 191 and 192. However, an allowance in a manufacturing of the HDD 100 may be generated and an error in the installation heights of the clock signal detection unit 221 and the position signal detection unit 222 may also be generated.

Figure 7:
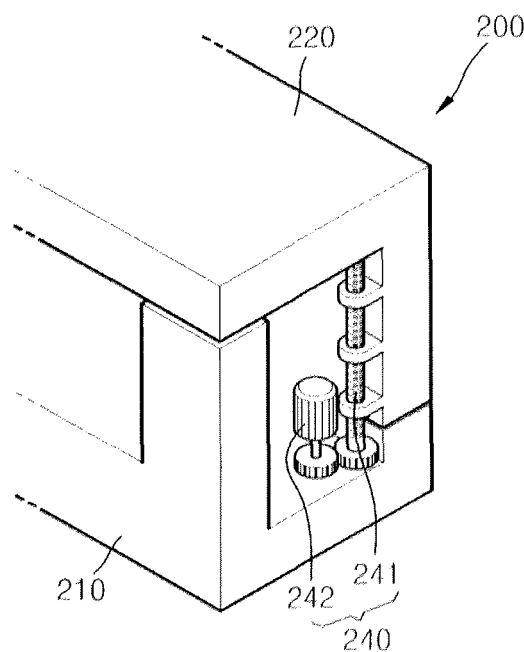
FIG. 7 is a partial perspective view illustrating a focusing unit provided in the servo track writer of FIG. 6.

Thus, as illustrated in FIG. 7, a focusing unit 240 which allows the laser beam emitted from the clock signal detection unit 221 and the position signal detection unit 222 to be accurately focused on the surfaces of the first and second segment tapes 181 and 182 may be provided in exemplary embodiments of the servo track writer 200.

To this end, the arm 220 is supported by the frame 210 by being separated from the frame 210 in order to be able to move up and down. In exemplary embodiments, as a unit for moving the arm 220 up and down, the focusing unit 240 may include a lead screw 241 coupled to the arm 220 and a drive motor 242 to rotate the lead screw 241. That is, when the lead screw 241 is rotated by the drive motor 242, the arm 220 coupled to the lead screw 241 is moved up and down so that the heights of the clock signal detection unit 221 and the position signal detection unit 222 installed at the arm 220 may be adjusted. Accordingly, since the focusing unit 240 may adjust a distance between the clock signal detection unit 221 and the first segment tape 181 and a distance between the position signal detection unit 222 and the second segment tape 182, the laser beam may be accurately focused on the surfaces of the first and second segment tapes 181 and 182. However, the present general inventive concept is not limited thereto. That is, in alternative exemplary embodiments, various other methods of adjusting the clock signal detection unit 221 and the position signal detection unit 222 with respect to the clock signal providing unit and the position signal providing unit, respectively.

Figure 8:
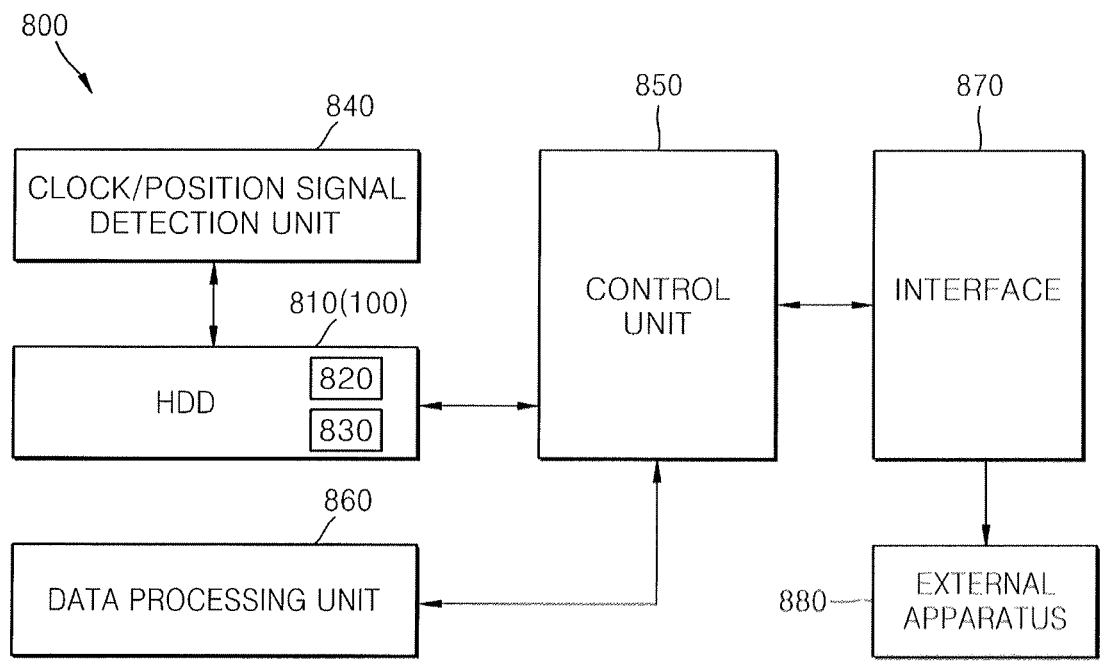
FIG. 8 is a schematic view illustrating an electronic apparatus including a HDD according to an exemplary embodiment of the present general inventive concept.

FIG. 8 is a schematic view illustrating an electronic apparatus including a HDD according to an exemplary embodiment of the present general inventive concept. In exemplary embodiments, the electronic apparatus 800 may include a camcorder, a camera, a computer, a printer, and various other devices which include a data storage unit. However, the present general inventive concept is not limited thereto.

As illustrated in FIG. 8, in an exemplary embodiment, the electronic apparatus 800 includes a HDD 810 having windows 820 disposed on a housing thereof, a clock/position signal providing unit 830, and a clock/position signal detection unit 840. As described above with respect to other exemplary embodiments, the HDD 810 includes at least one data storage unit (not illustrated) which communicates with the clock signal providing unit 840, and an actuator (not illustrated) which communicates with the position signal providing unit 840. That is, the HDD 810 is configured such that the clock/signal providing unit 840 provides a clock signal of the data storage disk and/or a position signal of the actuator.

The HDD 810 includes a clock/position signal detection unit 840 which corresponds to a location of the windows 820 and the clock/position signal providing unit 830. That is, the HDD 810 is configured such that the clock/position signal detection unit 840 may detect the clock signal of the data storage unit generated by the clock signal providing unit 830 via the windows 820. Similarly, the clock/position signal detection unit 840 may detect the position signal of the actuator generated by the position signal providing unit 830 via the windows 820. The windows 820 may provide an optical path between the clock/position signal providing unit 830 and the clock/position signal detection unit 840. However, the present general inventive concept is not limited thereto. That is, in alternative exemplary embodiments, the windows 820 may provide a path for audio signals, sounds, and/or electrical signals to be communicated between the clock/position signal providing unit 830 and the clock/position signal detection unit 840.

The HDD 810 may include a head unit (not illustrated) which may be used to read and/or write data from or onto the data storage unit. The HDD 810 may further include a terminal which extends therefrom. The electronic apparatus 800 may further include a control unit 850, a data processing unit 860, and an interface 870. The control unit 850 may be electrically or wirelessly connected with the HDD 810 to control an operation of the HDD 810. The control unit 850 may be connected with the data processing unit 860 to process data received and/or transmitted to the HDD 810. The interface 870 may be electrically or wirelessly connected to the control unit 850 and an external apparatus 880. The interface 870 may provide a user access to or control of an operation within the electronic apparatus 800 or within the external apparatus 880.

In exemplary embodiments, the focusing unit 240 may be automatically controlled. That is, an amount of light of the laser beam detected by the PD of the clock signal detection unit 221 and the position signal detection unit 222 may be measured. The amount of light of the laser beam detected by the PD may be compared to a reference light amount at the control unit 230. If there is a difference between the amount of light measured by the PD and the reference light amount, a signal to control the focusing unit 240 is generated by the control unit 230 so that the focusing unit 240 may be automatically controlled.

As described above, the HDD and the servo track writer according to the above exemplary embodiments of the present general inventive concept, servo track writing may be performed in a state in which the HDD is sealed. Thus, since the servo track information may be written to a disk installed in the HDD in a general environment, not in a clean room, the process costs associated therewith may be substantially reduced. Also, since the servo track writer according to the present general inventive concept includes a simple structure as compared to a conventional off-line servo track writer which separately includes a spindle motor and a positioner, a cost of equipment including the servo track writer may also be substantially reduced.

Furthermore, in the HDD according to the present general inventive concept, since relatively large holes are not formed in a housing, a strength and a shock-resistant characteristic of the housing are substantially improved. According to the present general inventive concept, re-working may be performed only by removing a sealing cover which covers windows on the housing, without requiring disassembly of the HDD.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A hard disk drive comprising:
a data storage disk;
an actuator to move a read/write head to a position on the data storage disk;
a clock signal providing unit disposed on the data storage disk to provide a clock signal of the data storage disk;
a position signal providing unit disposed on the actuator to provide a position signal of the actuator; and
first and second windows disposed in the housing to correspond to the clock signal providing unit and the position signal providing unit, wherein at least one of the first and second windows includes material to focus a laser beam.

2. The hard disk drive of claim 1, wherein the first and second windows are formed in the cover member of the housing.

3. The hard disk drive of claim 1, wherein a light transmitting member which transmits a laser beam and seals the housing is installed at each of the first and second windows.

4. The hard disk drive of claim 3, wherein the light transmitting member includes a flat glass or a lens.

5. The hard disk drive of claim 3, wherein an inner surface of the light transmitting member and an inner surface of the housing form a same plane.

6. The hard disk drive of claim 1, wherein a sealing cover to cover each of the first and second windows is attached to an outer surface of the housing.

7. The hard disk drive of claim 1, wherein the clock signal providing unit is provided at an outermost circumferential portion of the data storage disk.

8. The hard disk drive of claim 7, wherein the clock signal providing unit is a segment tape attached at the outermost circumferential portion of the data storage disk.

9. The hard disk drive of claim 7, wherein the clock signal providing unit is a plurality of segments marked on the outermost circumferential portion of the data storage disk.

10. The hard disk drive of claim 1, wherein the actuator comprises:
a pivot shaft disposed on the base member of the housing;
an actuator arm rotatably coupled to the pivot shaft; and
a voice coil motor to rotate the actuator arm,
wherein the position signal providing unit is provided at an outer edge portion of a rear end portion of the actuator arm, a middle portion of the actuator arm, and an outermost circumferential portion of the pivot shaft.

11. The hard disk drive of claim 10, wherein the position signal providing unit is a segment tape attached at any one of the outer edge portion of a rear end portion of the actuator arm, the middle portion of the actuator arm, and the outermost circumferential portion of the pivot shaft.

12. The hard disk drive of claim 10, wherein the position signal providing unit is a plurality of segments marked on any one of the outer edge portion of a rear end portion of the actuator arm, the middle portion of the actuator arm, and the outermost circumferential portion of the pivot shaft.

13. A servo track writer to write servo track information to a disk of the hard disk drive of claim 1, the servo track writer comprising:
a frame;
an arm coupled to and supported by the frame;
a clock signal detection unit installed on the arm at a position to correspond to a first window of the hard disk drive and to detect a clock signal of the data storage disk provided by a clock signal providing unit;
a position signal detection unit installed on the arm at a position to correspond to a second window of the hard disk drive and to detect a position signal of an actuator arm provided by a position signal providing unit, wherein at least one of the first and second windows includes material to focus a laser beam; and
a control unit to control the actuator and a read/write head to write servo track information to the data storage disk according to the clock signal and the position signal respectively detected by the clock signal detection unit and the position signal detection unit.

14. The servo track writer of claim 13, wherein the frame comprises a base to support the hard disk drive.

15. The servo track writer of claim 13, wherein the arm extends above the hard disk drive.

16. The servo track writer of claim 13, wherein the clock signal detection unit and the position signal detection unit respectively detect, by using a laser beam, the clock signal of the disk and the position signal of the actuator provided by the clock signal providing unit and the position signal providing unit.

17. The servo track writer of claim 16, wherein each of the clock signal detection unit and the position signal detection unit comprises:
a laser diode to emit a laser beam to a surface of the clock signal detection unit or the position signal detection unit via the first or second window; and
a photodiode to detect the laser beam reflected by the clock signal detection unit or the position signal detection unit.

18. The servo track writer of claim 13, wherein, after generating a position control signal to control a position of the actuator and a signal related to servo track information to be written to the disk according to the clock signal and the position signal, the control unit transmits the position control signal to a voice coil motor of the actuator and the signal related to the servo track information to the read/write head.

19. The servo track writer of claim 13, further comprising a focusing unit to focus a laser beam emitted by the clock signal detection unit and the position signal detection unit on surfaces of first and second segment tapes.

20. The servo track writer of claim 19, wherein the arm is supported by the frame to move up and down in a state of being separated from the frame, and the focusing unit to move the arm up and down, comprises:
- a lead screw coupled to the arm; and
- a drive motor to rotate the lead screw.

21. A hard disk drive having a housing, comprising:
- a data storage disk having a clock signal providing unit to generate a clock signal of the data storage disk disposed within the housing;
- a read/write head positioned on an actuator arm and rotated about a pivot shaft having a position signal providing unit to generate a position signal of the read/write head rotatably coupled within the housing; and
- at least one window disposed on the housing to correspond with at least one of the clock signal providing unit and the position signal providing unit, wherein the at least one window including material to focus or enhance a laser beam.

22. The hard disk drive of claim 21, wherein the clock signal providing unit is at least one of a segment tape or a plurality of segments marked on the data storage disk.

23. The hard disk drive of claim 21, wherein the position signal providing unit is at least one of a segment tape or a plurality of segments marked on the read/write head.

24. A servo track writer, comprising:
- a frame;
- an arm coupled to and supported by the frame;
- a clock/position signal detection unit installed on the arm at a position to correspond to at least one window of a hard disk drive and to detect a clock signal of a storage unit position signal of an actuator of the disk provided by a clock/position signal providing unit,
- wherein the arm is supported by the frame to move up and down in a state of being separated from the frame;
- wherein the at least one window includes a lens.

25. The servo track writer of claim 24, wherein the housing includes a first window corresponding to a first signal providing unit of the data storage unit and a second window corresponding to a second signal providing unit of the head unit.

26. The servo track writer of claim 24, wherein the lens is configured to enhance or focus a laser beam.

27. An electronic apparatus, comprising:
- a housing to store at least one data storage disk having a clock signal providing unit disposed thereon;
- an actuator having a read/write head positioned on an actuator and rotated about a pivot shaft and a position signal providing unit rotatably coupled within the housing; and
- at least one window disposed on the housing to correspond with at least one of the clock signal providing unit and the position signal providing unit, wherein the at least one window including a lens.

28. The electronic apparatus of claim 27, wherein the clock signal providing unit is at least one of a segment tape or a plurality of segments marked on the data storage disk.

29. The electronic apparatus of claim 27, wherein the position signal providing unit is at least one of a segment tape or a plurality of segments marked on the actuator.

30. The electronic apparatus of claim 27, wherein the at least one window includes first and second windows corresponding to the clock signal providing unit and the position signal providing unit, respectively.

31. The electronic apparatus of claim 27, wherein each window of the at least one window includes a light transmitting member to transmit a laser beam and to seal the housing.

32. A method comprising:
- disposing at least one data storage disk having a clock signal providing unit disposed thereon within the housing;
- coupling an actuator having a read/write head positioned on an actuator arm and rotated about a pivot shaft and a position signal providing unit within the housing;
- forming at least one window on the housing to correspond with at least one of the clock signal providing unit and the position signal providing unit; and
- disposing material to focus or enhance a laser beam in the at least one window.

33. The method of claim 32, wherein the forming the at least one window includes forming first and second windows to correspond to the clock signal providing unit and the position signal providing unit, respectively.

34. The method of claim 32, further comprising:
- disposing a light transmitting member to transit a laser beam and to seal the housing at each window of the at least one window.

35. A hard disk drive, comprising:
- a servo track writer having:
  - an arm coupled to and supported by a frame;
  - a clock signal detection unit installed on the arm at a position to correspond to a window of the hard disk drive and to detect a clock signal of a disk provided by a clock signal providing unit,
  - wherein the arm is supported by the frame to move up and down in a state of being separated from the frame;
- a housing having an assembly with a disk; and
- a terminal formed on a first portion of the housing to transmit a first signal read from the disk,
- wherein the window is formed on a second portion of the housing to transmit a second signal read from the disk to the clock detection unit and the window further comprising a lens to focus a light beam passing through the window.

36. The hard disk drive of claim 35, wherein the first signal is an electrical signal and the second signal is an optical signal.

37. The hard disk drive of claim 35, wherein the first portion is spaced apart from the second portion.

38. The hard disk drive of claim 35, wherein the housing is sealed except for the terminal and the window to communicate with one or more external units.

* * * * *